Dec. 30, 1930.  G. KIRK ET AL  1,786,432
LUBRICATING DEVICE
Filed Jan. 4, 1929

Inventor:
George Kirk and
By Andrew C. Klauer
Attorneys.

Patented Dec. 30, 1930

1,786,432

UNITED STATES PATENT OFFICE

GEORGE KIRK, OF NORTH PROVIDENCE, AND ANDREW C. DANVER, OF PROVIDENCE, RHODE ISLAND; SAID KIRK ASSIGNOR TO SAID DANVER

LUBRICATING DEVICE

Application filed January 4, 1929. Serial No. 330,334.

This invention relates to improvements in lubricating devices for use with internal combustion engines.

One object of the invention is to provide a device of the type specified for introducing a heat-resisting and decarbonizing lubricant directly into the engine cylinders whereby, in addition to lubricating the bearing surfaces, it will decompose the carbon formed by combustion and deposited on the pistons and other parts.

Another object of the invention is to provide a device of the type specified which is controlled entirely by the vacuum formed during the suction stroke of the pistons.

Another object of the invention is to provide a lubricating device which is simple in construction and adapted for convenient attachment to the intake manifold of motors of practically all types.

Another object of the invention is to provide a device of the type specified having adjusting-means for regulating the flow of minute quantities of lubricant into the engine cylinders and which, when once set, will not change its adjustment except by manual control.

Another object of the invention is to provide a device of the type specified which will not alter or affect the proper carburetion of the fuel.

Further objects of the improvement are set forth in the following specification which describes a preferred form of construction of the invention as illustrated by the accompanying drawings. In the drawings.

Figure 1:
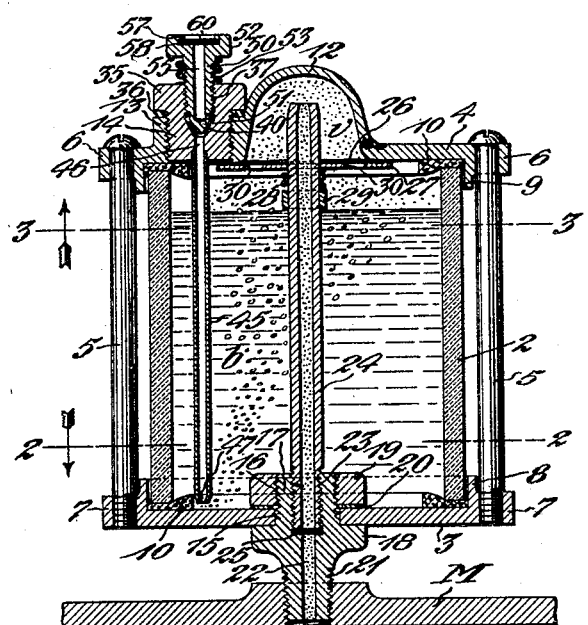
Fig. 1 is a vertical sectional view of the lubricating device shown as attached to the intake manifold of an engine.
Figures 2, 3:
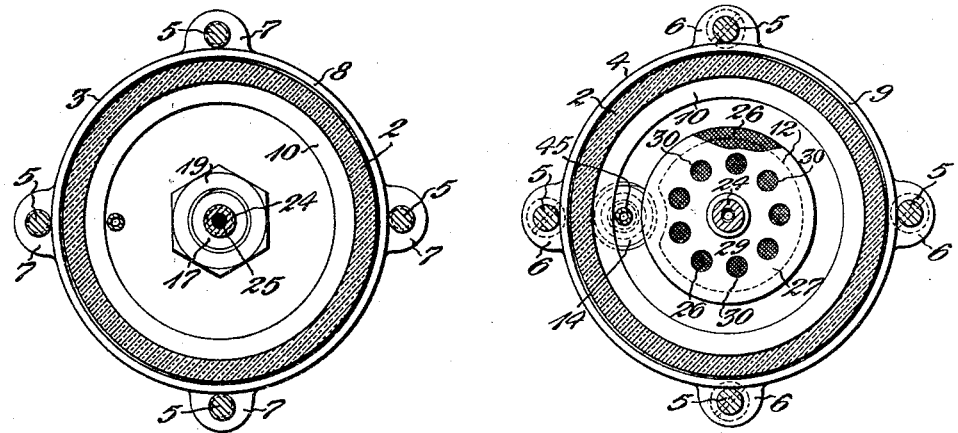
Fig. 2 is a horizontal sectional view of the same taken on line 2—2 of Fig. 1.
Fig. 3 is a similar sectional view taken on line 3—3 of Fig. 1.

The lubricating device of the present invention is preferably constructed in the form of a cylindrical reservoir 2 which may be made of glass or other suitable material and mounted on a base 3 with a cap or cover 4 closing its top. These several parts are held together by means of tie-rods or screws 5 passing through ears 6 on the rim of the cover 4 and screwed into threaded holes in similar ears 7 on the base 3. The cylinder 2 is received within flanges 8 and 9 on the base 3 and cover 4, respectively, with washers or gaskets 10 of suitable packing material, such as rubber or cork, compressed against its ends. The cover 4 is formed with a central domed chamber 12 and at one side thereof is a boss 13 having a threaded opening for receiving a filler cap 14 to be later described.

At the center of base 3 is a circular opening 15, through which is inserted the threaded end 16 of a nipple or coupling 17 provided with a hexagonal portion 18. A nut 19 is screwed onto the upper threaded end of the nipple 17 and a gasket or washer 20 is compressed between the nut 19 and the upper face of the base 3 to secure the nipple in place while providing a sealed joint. The lower end 21 of the nipple 17 is threaded to adapt it to be screwed into a threaded hole in the wall of the intake manifold M.

The coupling or nipple 17 is bored with an axial passage 22, the upper end of which is counterbored and threaded at 23 to receive the threaded end of a vertical stand-pipe or tube 24. The lower end of the tube 24 seats against a fine-mesh wire screen 25 which is inserted in the counterbore 23 of the coupling 17 to prevent sparks, caused by backfiring, from entering the oil reservoir 2. The tube 24 is open at its upper end which terminates within the semi-spherical dome 11 rising from the cover 4.

A fine mesh screen or filter 26 extends across the bottom of the dome 11, being supported on a circular plate or disk 27. The disk 27 is held against the under side of the cover 4 by means of a helical spring 28 surrounding the pipe 24 and supported by a collar 29 fastened to the pipe. The disk 27 is perforated with a plurality of holes or inlet openings 30 arranged around and spaced at a distance from the oil pipe 24. The purpose of this arrangement is to provide a baffle-plate or guard for preventing the oil from flowing into the dome 11 when the motor on which the lubricator is installed is suddenly tilted or jolted, due to depressions in the roadway. Through this improved arrangement the oil splashing against the under side of the disk or baffle-plate 27 around the pipe 24 will drip or drain back into the main reservoir.

Figure 4:
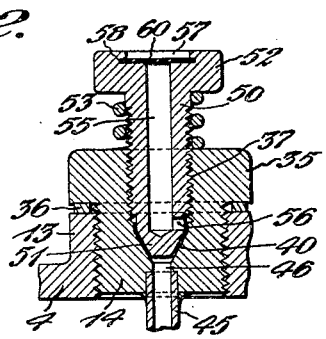
Fig. 4 is an enlarged sectional view of the adjusting-means showing it in detail.

Referring now to Fig. 4, the filler-cap 14 is provided with a hexagonal head 35 beneath which is placed a washer or gasket 36 for sealing the opening through the cover 4. In the filler-cap 14 is a threaded axial hole 37 terminating in a beveled or tapered valve-seat 40.

Inserted into the under side of the filler-cap 14 is a breather-pipe or atomizer-tube 45 having its upper end communicating with the valve-opening 37 through a duct 46. The lower end of the breather-pipe 45 is contracted to form a nozzle-like opening 47 which centralizes the suction draft through the tube, while the larger area of the bore of the tube provides a storage space for the air.

Screwed into the opening 37 in the filler-cap 14 is a valve-adjusting screw 50 formed with a beveled end 51 fitted to the seat 40 in the cap. The screw 50 is provided with a knurled head 52, beneath which is a helical spring 53 bearing against the top of the filler-cap 14. The spring 53 acts to resist the turning of the screw 50 and thereby serves to maintain it in its position of adjustment against the effects of vibration and jar.

The adjusting-screw 50 is provided with a central air-duct 55, the lower end of which has a lateral passage 56 opening through its side above the valve-seat 40. The head 52 of the screw 50 is counterbored at 57 and undercut at 58 to receive a dust-screen or filter 60. It will be observed that the cap 14 together with its attached breather-tube 45 and valve-adjusting screw 50 may be readily removed from the cover 4 to fill the reservoir with oil without disturbing the adjustment of the air-valve. The method of operation of the improved device is as follows:

The apparatus is attached to the intake manifold M of the motor or engine as illustrated in Fig. 1. The filler-cap 14 with its atomizer unit is detached from the cap 4 and a heat-resisting and carbon-softening lubricant is poured into the reservoir 2 through the opening 13. The filler-cap 14 is then replaced and screwed down against its seat through the use of a wrench. The device is then ready to supply lubricant to the engine in the manner as next explained.

As the piston of any cylinder of the engine makes a downward suction stroke a vacuum is created within the intake manifold M and suction created through the pipe 24 in the oil chamber of the lubricator. A partial vacuum it set up in the upper part of the chamber which causes ingress of air through the screened opening of the adjusting-screw 50 and down through the atomizer tube 45.

The air is thus drawn into the oil through the tube 45 with the amount regulated or governed by the adjustment of the valve-screw 50 with relation to its seat 40. Bubbles of air, indicated at $b$ in Fig. 1, are formed which rise to the top of the chamber 2, becoming saturated with the lubricant as they ascend. Upon reaching the surface of the oil the bubbles burst, throwing off smaller oil saturated bubbles forming a vapor indicated at $v$. This vapor is drawn upwardly through the holes 30 in the baffle-plate 27 and into the dome 12, being filtered by the screen 26 before passing down through the tube 24 and into the intake manifold M. Upon entering the manifold the oil unites with the gas vapor therein, and is thus carried to the combustion chamber.

The oil is only partially consumed in the combustion chamber, and upon the exhaust stroke of the piston the residue passes through the exhaust valves to lubricate their stems and soften the carbon which collects on these and adjacent parts. The lubricant being thus supplied constantly will keep the engine surfaces in a moistened condition, thereby repelling the deposit of carbon thereon.

It will thus be seen that the present invention provides a particularly simple and efficient device for introducing a decarbonizing lubricant directly into the cylinders of an internal combustion motor or engine to lubricate the bearing surfaces not easily supplied by the ordinary oiling means. Furthermore and most important, the improved device maintains a modicum of lubricant on the surface exposed to carbonization which has the effect of repelling or reducing the carbon deposit. Through the improved arrangement of the baffle-plate and filter-screen, as hereinbefore explained, an excessive amount of lubricant is prevented from being fed to the cylinders to form carbon; and by means of the improved adjusting-valve the amount of lubricant may be minutely regulated as required to provide for high efficiency of the engine under all conditions of speed.

While the present specification and drawings describe and illustrate a preferred form of construction of the device it is to be understood that various modifications may be made in the details thereof without departing from the spirit or scope of the invention.

Therefore, without limiting ourselves in this respect, we claim:

1. In a lubricating device, the combination of an oil reservoir having a domed top, an intake pipe having an outlet in the dome of the reservoir and extending down through the bottom thereof, means for connecting the lower end of said pipe with the intake manifold of an engine, a baffle-plate partitioning the dome from the reservoir and provided with restricted openings disposed outwardly from the intake pipe, and an atomizing duct leading from the atmosphere to the bottom of the reservoir.

2. In a lubricating device, the combination of an oil reservoir, a vapor compartment at the top of said reservoir, a wire filter-screen separating said compartment from the interior of the reservoir, a baffle-plate between the compartment and reservoir formed with a plurality of spaced holes, an intake pipe leading from the vapor compartment and adapted to be connected with the intake manifold of an engine, and an air-duct leading from the atmosphere to the bottom of the reservoir.

3. In a lubricating device, the combination of an oil reservoir having a top provided with a central domed chamber, a baffle-plate separating said chamber from the reservoir and provided with restricted openings, a wire filter-screen covering the openings in the baffle-plate, an intake pipe leading from the chamber and adapted for connection with the intake manifold of an engine, and an air-duct leading from the atmosphere to the bottom of the oil reservoir.

4. In a lubricating device, the combination of a reservoir, a cover for the reservoir provided with a central dome forming a vapor chamber, an intake pipe extending through the bottom of the reservoir and opening at its upper end into the vapor chamber, means at the lower end of said pipe for connecting it directly with the intake manifold of an engine to support the device therefrom, a filler-cap removably held in the cover and provided with an air-passage, a breather-tube attached to the filler-cap and reaching to the bottom of the reservoir, and an adjusting-screw in the filler-cap for regulating the size of its air-passage.

5. In a lubricating device, the combination of an oil reservoir, a cover for the reservoir provided with a domed vapor chamber, an intake pipe extending through the bottom of the reservoir with its upper end opening into the vapor chamber, means for directly connecting the intake pipe with the intake manifold of an engine to support the device therefrom, a baffle-plate surrounding the intake pipe and provided with a series of restricted apertures, means on the intake pipe for holding the baffle-plate in position to partition the vapor chamber from the reservoir, an air-passage to the reservoir, adjusting means for regulating the size of the air-passage, and an air-duct leading from the air-passage to the bottom of the reservoir.

In testimony whereof we affix our signatures.

GEORGE KIRK.
ANDREW C. DANVER.